United States Patent [19]

Borbas et al.

[11] Patent Number: 4,937,850
[45] Date of Patent: Jun. 26, 1990

[54] PROGRAMMABLE AUTOMATIC CALL-THRU SET

[75] Inventors: William F. Borbas, Woodridge; Robert D. Hahn, LaGrange; Douglas A. Hahn, Geneva, all of Ill.

[73] Assignee: Illinois Bell Telephone Company, Chicago, Ill.

[21] Appl. No.: 289,209

[22] Filed: Dec. 22, 1988

[51] Int. Cl.$^5$ .......................... H04J 1/16; H04M 3/32
[52] U.S. Cl. ............................................ 379/6; 379/10; 379/14; 379/18; 370/14
[58] Field of Search ..................... 379/6, 9, 10, 14, 18, 379/22

[56] References Cited

U.S. PATENT DOCUMENTS 4,566,093 1/1986 Diaz ........................................ 379/6

Primary Examiner—Stafford D. Schreyer
Attorney, Agent, or Firm—Willian Brinks Olds Hofer Gilson & Lione

[57] ABSTRACT

The present invention provides a test set which checks the communication line from a central office to a telephone responder which has a predetermined telephone number and which generates an output signal consisting of a predetermined sequence of signals. The checking is performed from a central testing station from where an operator inputs a test signal which identifies the telephone number of the test set located in the central office from which the test is to be made. Once the connection is established, the telephone number of the responder to be called is transmitted. The test set includes a signal detector which identifies an input signal. The signal detector is interfaced to the responder transmission medium such that the signal detector receives responder output signal as an input signal. The test set further includes a memory which includes the correct signal which should be received from the responder with called telephone number, and a processor. The processor is interfaced to the memory and is coupled to receive the identification signal and the test signal. The processor includes a program which instructs the processor to access the correct signal which should be received and compare the identification signal to the correct signal. The processor then generates a result signal which indicates whether the correct signal was received from the responder with the telephone number which was dialed.

19 Claims, 3 Drawing Sheets

PROGRAMMABLE AUTOMATIC CALL-THRU SET

BACKGROUND OF THE INVENTION

The present invention relates generally to a system and apparatus for checking a telephone communications network from a centralized remote location and more particularly to a system and apparatus for checking telephone communications from a telephone company central office to each of the prefixes and area codes routed by that central office.

Telephone communication networks often require that the carrier verify the routing of the dialed digits of a telephone call. Verification is necessary not only to insure that a call will reach the appropriate destination, but also to ensure proper billing. Improper routing of calls may be caused by translation or wiring errors, depending on the type of office. Verification is necessary for example, before a new central office switch is cut into service either replacing an existing switch or establishing new service. The system must also be verified by the carrier each time a new prefix is established in the system or transferred from one central office to another.

The verification procedure requires that a test call be made to every prefix and area code within the local area telecommunications area (LATA). In a typical LATA this may require over 900 tests calls.

Major projects such as tariff changes or a split in area codes from a single area code to two or more area codes require a tremendous amount of work in all of the central switching offices at the same time. In these cases, calls must be made from each central office to all prefixes, to check correct routing and charging conditions.

Special services provided by the carrier such as Local Public Opinion Polling Services (LPOPS) or public announcement systems (time of day, weather, etc.) also require that the carrier verify the routing of the calls by calling a large number of test numbers.

Presently, tests are performed by assigning a unique test telephone number to each prefix and area code and verifying that the test number can be reached by placing a test call to that number. A telephone responder is connected to the test number such that when the test number is called the responder generates a predetermined verification signal. If it is determined that the correct predetermined verification signal is received when a test number is called then the call is considered to be properly routed. If the correct verification signal is not received when the test number is called then the call is considered to be improperly routed and the error must be identified and corrected.

Typically, the verification or response signals which are generated by the responders are of three types. Analog electronic switching system (ESS) machines have a call-thru test line which responds with several seconds of busy tone followed by a steady tone. Digital ESS machines respond with a tone which has a frequency of 1004 Hz. Finally, electromechanical offices respond with a busy tone, interrupted tone, or a combination of both.

Presently, the mass dialing procedure is implemented using a computer, such as a personal computer, in conjunction with an automatic dialing modem. The computer and automatic dialing modem must be connected to a telephone line served by the central office to be tested. Once this connection has been established a technician instructs the automatic dialing modem to dial the predetermined telephone numbers which are to be tested.

As the test numbers are dialed using the personal computer and the autodialing modem, a technician monitors the signal received from the called responder to confirm that the correct response is received on each call. In view of the large number of tests that must be made to ensure that all of the prefixes and area codes are verified, these tests typically require many human hours. For example, if properly performed, the test calls required for a central office cut-over take one technician a substantial part of an entire shift.

In addition to the amount of hours required, the testing is tedious and boring. The testing is thus subject to operator error. Errors may arise due to inaccurate analyzing and recording of the results. Additionally, if personnel is limited, only a portion of the required tests may be performed.

On the other hand, if the tests are improperly performed or not performed at all because of a shortage of personnel, the errors may be discovered by customers before they are discovered by the carrier, or the carrier may improperly bill the consumer for the services.

The disadvantages of this procedure are obvious. This procedure requires that the carrier spend valuable technician time for this testing operation. To verify the capability of the network to originate a call from a single originating central office to another predetermined central office, a technician must travel to the originating location. It is therefore desirable to provide a system which can be used to originate a call from a central office to any location in the telecommunications network without requiring a technician to physically travel to the central office.

Therefore, in view of the above, it is an object of the present invention to provide a system which automatically tests whether the communication lines from a central office are properly routed to all of the telephone prefixes and area codes in the telecommunications network.

It is a further object of the present invention to provide a system which tests proper routing of communication lines of several central offices, each routing to a plurality of telephone numbers having different area codes and prefixes, from a centralized testing location.

It is another object of the present invention to provide a system which has the ability to test communication lines from a plurality of central offices which generate different types of response signals.

It is still a further object of the present invention to provide a system which can be used to automatically originate a call from a central office to another predetermined central office in the telephone network.

SUMMARY OF THE INVENTION

To achieve the foregoing, and other objects, and in accordance with the purposes of the present invention, the test set apparatus of the present invention checks the routing from a central office to a telephone responder which has a predetermined telephone number and which generates an output signal consisting of a predetermined sequence of signals. The checking is performed from a central testing location which includes means for inputting a test signal which identifies the telephone number of the responder to be called. The test signal is transmitted over the dial up connection from the centralized testing location to the test set. When this signal is received by the test set, a call is placed over a test telephone line served by the central office under test and the test is started. A signal detector in the test set is interfaced to the test telephone line to receive the responder output. The test set further includes a processor memory which includes the correct signal which should be received from the responder having the predetermined telephone number, and a processor. The processor is interfaced to the memory and is coupled to receive the identification signal and the test signal. The processor includes program logic which instructs the processor to access the correct signal which should be received and compare the identification signal to the correct signal. The processor then generates a result signal which indicates whether the correct signal was received from the responder with the telephone number which was dialed.

Thus, the arrangement of the present invention provides an apparatus which may be used to automatically determine whether telephone calls to each of the prefixes and area codes are properly routed in the network. Since the operation is performed automatically, human error in identifying the signals which are received and transcribing the results is eliminated.

In another aspect of the invention, for calls placed to numbers not connected to a responder, the test set includes circuitry which allows a call made to a telephone number with a pre-recorded message to be monitored by the originating location. This embodiment permits verification of the network's ability to communicate from one predetermined location in the network to any other location in the network.

Additional objects, advantages and novel features of the invention will be set forth in part in the description which follows, and in part will become apparent to those skilled in the art upon examination of the following or may be learned by practice of the invention. The objects and advantages of the invention may be obtained by means of the combinations particularly pointed out in the appended claims.

DETAILED DESCRIPTION OF THE PRESENTLY PREFERRED EMBODIMENTS

Figure 1:
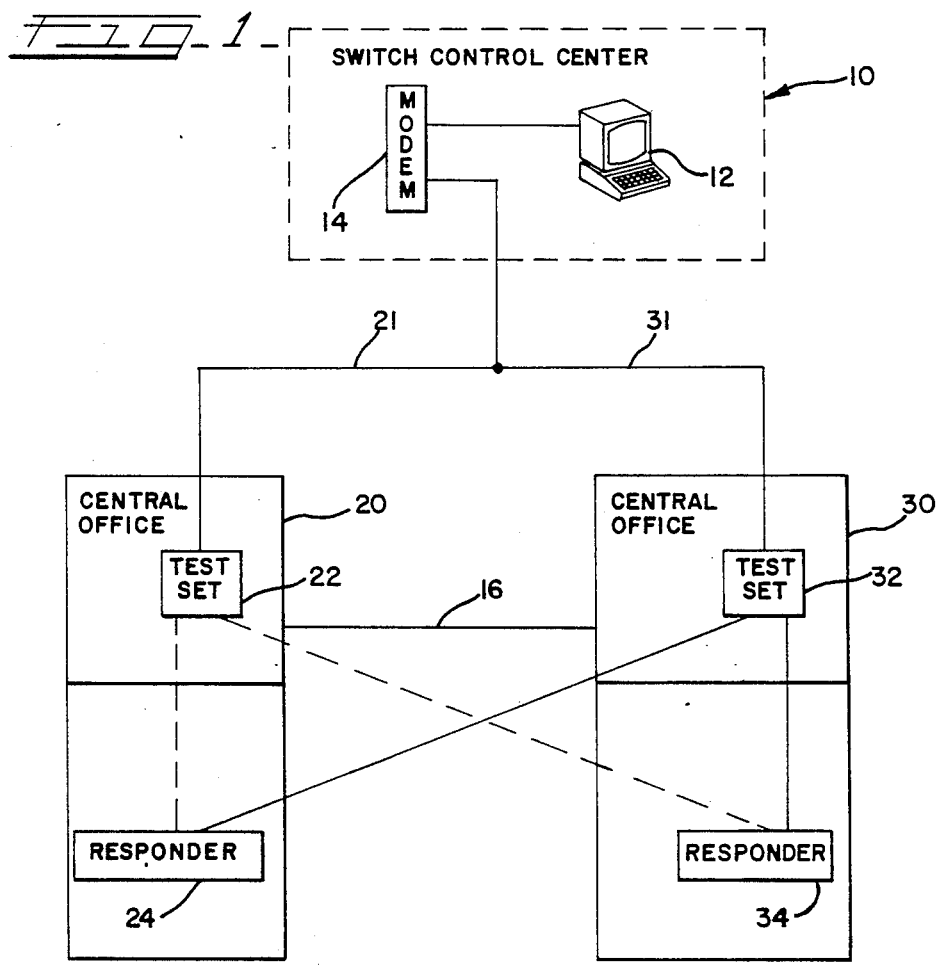
FIG. 1 is a schematic representation of a preferred embodiment of the system of the present invention.

Referring now to the drawings and specifically to FIG. 1 a preferred embodiment of the system of the present invention includes a central switching control center 10 which selectively communicates with a plurality of central offices 20 and 30. The switching control center 10 includes a system, preferably a personal computer (PC) 12 and modem 14, through which the operator selectively communicates with one of the central offices 20 or 30. Communication from the switching control center 10 to the central offices 20, 30 is established over dial up/monitor lines 21, 31 respectively. Preferably the desired test numbers are input as test input signals by means of the computer keyboard. The computer 12 and modem 14 also provide the switching control center 10 with the ability to receive responses from the tests sets 22, 32 at the central offices 20, 30 over a dial up/monitor line 21, 31. A suitable PC is available from Compaq Corporation and a suitable modem is available from several commercial sources.

In the following description of the preferred embodiments of the present invention the switching control center communicates with the central offices and the central offices communicate with the responders over conventional telephone lines. It will be readily apparent to those skilled in the art that other forms of a transmission medium may also be suitable depending on the particular application intended.

Each of the central offices 20, 30 service a certain number of telephone numbers which may include different area codes and prefixes. As illustrated in FIG. 1, the central offices 20 and 30 communicate with each other over a trunk 16.

In the system of this preferred embodiment, each central office communicates with a responder, and preferably with a plurality of responders which correspond or are assigned to each of the area codes and prefixes which are to be tested. The responders each generate a predetermined response signal which consists of a predetermined sequence of individual signals. In this manner the routing of the communication line from each central office to each of the test numbers of interest can be verified.

Each central office 20, 30 includes a test set 22, 32. For purposes of illustration only the test set 22 will be described in detail. It will be readily apparent to those skilled in the art that the other test sets in the system have a similar configuration.

The test set 22 includes means, described in more detail below, for receiving a signal corresponding to a telephone number which is to be called from the switching control center 10, and means for dialing the telephone number to communicate with the corresponding responder. If the telephone number is not serviced by the central office, the central office communicates over the trunk 16 to the other central office which routes the desired telephone number to the responder in that central office. The test set 22 preferably also includes means for monitoring the response signals which are generated by the responder 24.

As discussed above, there are typically three types of verification signals that are generated by the different ESS machines. Therefore, the test set 22 preferably includes means for monitoring, distinguishing and identifying these three types of signals, (or any other signal generated by an ESS machine).

The test set 22 also includes means for comparing the verification or response signals from the responder 24 to a correct response signal which is preferably encoded in the test set. Finally, the test set preferably includes means for generating a result signal which indicates whether the correct response was received from the tested responder and transmitting the result signal to the switching control center 10.

An example of the operating procedure for the above-described preferred embodiment of the system of the present invention is now given. The operator at the switching control center 10 first establishes communication with one of the test sets at one of the central offices. After the operator has established communication with the desired central office (central office 20 is used as an example), the operator inputs the desired telephone test number(s) which are to be called. The PC 12 transmits the telephone numbers to the test set 22 by means of the modem 14. The test set 22 then dials the telephone number(s) received from the switching control center 10 to communicate with the appropriate responder 24,34.

The responder which is communicated with transmits a verification signal back to the test set 22. As explained in more detail below, the test set 22 includes all of the correct response signals which should be received from the responders. The test set 22 then compares the signal received from the responder which was communicated with to the signal which should have been received from this responder.

If the two signals match, the test set generates a signal which indicates that the communication line for the dialed number is correctly routed. If the two signals do not match the test set 22 generates a response signal indicating that there is an error in the network. The response signal is then transmitted back to the switching control center 10.

The personal computer 12 in the switching control center 10 may be programmed to test numbers in just one central office or alternatively to test a number of offices sequentially. Results of the test may be stored in the file, which would later be interrogated by the personal computer 12 in the switching control center 10. Errors would be corrected, and those numbers with errors could then be retested.

Figure 2:
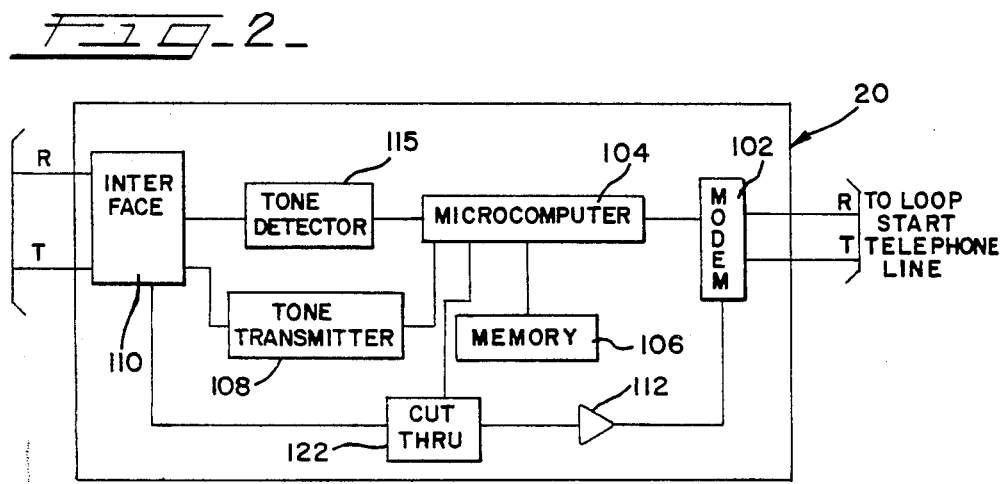
FIG. 2 is a schematic representation, in block diagram form, of a preferred embodiment of the test set of the present invention.

Referring now specifically to FIG. 2, a more detailed description of a preferred embodiment of the test set 22 is given. The test set preferably communicates with the host computer or terminal 12 by means of a modem 102. As discussed above, the operator indicates which telephone number(s) are to be tested from the host computer 12, which in turn transmits signals correlated with these telephone numbers over a standard telephone line to the modem 102.

A computer, preferably in the form of a microprocessor 104, receives the signals from the modem 102 and determines which test is to be performed from the sequence of the digits dialed. A more detailed description of this function is given below. The microprocessor 104 is operatively connected to access a program which has been stored in a memory such as a read only memory (ROM) 106. The microprocessor 104 then transmits signals representing the telephone number which is to be dialed to a mechanism for dialing the telephone number.

Figure 3:
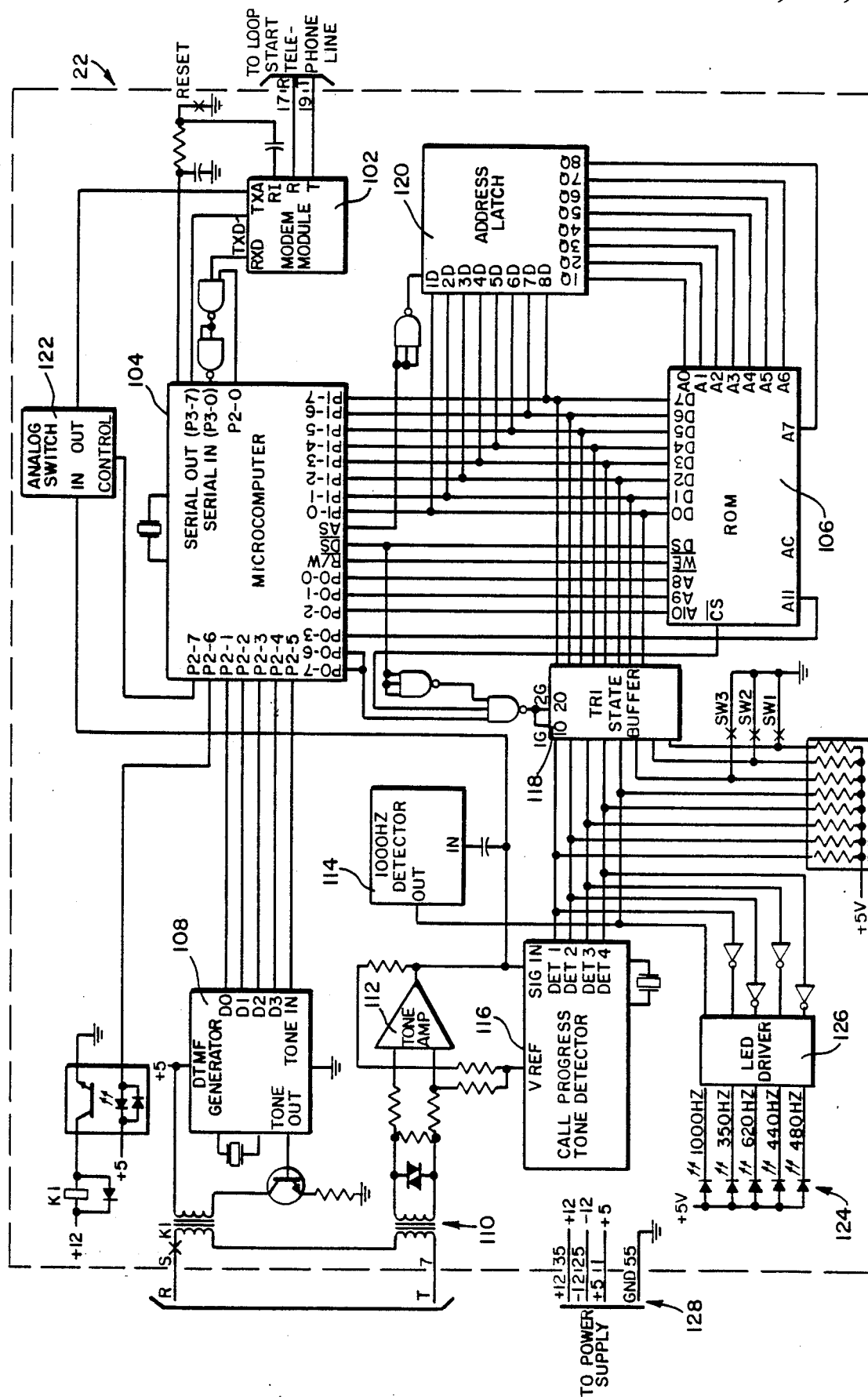
FIG. 3 is an electrical schematic of a preferred embodiment of the test set illustrated in FIG. 2.

As illustrated in FIG. 3 in the preferred embodiment, the dialing is performed by means of frequency generator and preferably a dual tone multi-frequency (DTMF) generator 108. A suitable DTMF generator is available from National or Exar. As will be recognized by those skilled in the art other means, such as an automatic-dialing modem located at the switching control center 10, may be used to dial the object responder. However this automatic-dialing modem arrangement would not have the required automatic response recognition or cut-thru capability.

A telephone interface, preferably in the form of a transformer 110 and a relay K1 is used to transform the signals from the DTMF generator 108 and transmit the signals over a standard telephone line to route the call to the object responder. The output signals generated by the responder which has been dialed are received by the transformer 110 over conventional telephone lines.

The analog signals are then amplified by integrated circuit amplifier 112. A suitable tone amplifier is available from several manufacturers, such as National, Motorola, and GE/RCA, as model No. LM1458.

The tone amplifier 112 is connected to a tone detector which is embodied in the present invention in the form of a single 1000 Hz (actually 1004 Hz) detector 114 and a call progress tone detector 116. The single frequency tone detector 114 and the call progress tone detector 116 are thus capable of recognizing the patterns of tones received from the various types of ESS and mechanical machines. For example the 1000 Hz detector and call progress tone detector are operative to detect signals from analog ESS machines, which respond with several seconds of busy tone followed by a steady tone; digital ESS machines which respond with a 1004 Hz tone; or a tone from electromechanical offices which respond with busy tone, interrupted tone, or a combination of both. A suitable single frequency tone detector is available from several manufacturers, such as National, Signetics, and Samsung, as model No. LM567 and a suitable call progress tone detector is available from Teletone as model No. M-982.

The signals from the single frequency tone detector 114 and the call progress tone detector 116 are then transmitted to the microprocessor 104. The microprocessor 104 then communicates with the ROM 106 to access the correct pattern of tones which should have been received from the telephone number which was dialed.

The system includes logic preferably in the form of a program stored in ROM 106 to compare the tone combinations and indicate whether or not a correct signal has been received. The program then instructs the microprocessor 104 to generate an output signal indicating whether the correct destination has been reached or whether the intended destination has not been reached. This test is hereinafter referred to as a call-thru test. An exemplary embodiment of code written in BASIC programming language for the Z8 microprocessor available from Zilog Corp. is given in Table 1.

TABLE 1

```
10  PRINT " ";
20  GOSUB 580
30  PRINT " ";
40  GOSUB 580
50  PRINT "X";
60  GOSUB 580
70  PRINT "Y";
80  GUBSUB 580
90  PRINT " NP" 00,COUNT 2": REM INITIALIZE
     DATA SET
100 X=193:@2=X:@246=0
110 C=0
120 INPUT A:REM GET DIGITS OR TEST CODE
130 REM 11 IS CALL THRU - 12 IS RESET - ANY
     GREATER IS *15 SEC MONITOR
140 IF A=11 THEN 320
150 IF A=12 THEN 100
160 IF A>12 THEN 440
170 IF A=0 THEN A=10
180 X=129:@2=X:REM OFFHOOK
190 IF C=0 THEN GOSUB 240
200 A=A*2:X=X+A:@2=X:X=X+%20:
     @2=X:REM PULSE THE DIGIT
210 B=0:B=B+1:REM TONE DURATION
220 X=AND(X,%DF):@2=X
230 GOTO 120
240 B=0:C=1:REM TIMING FOR DIAL TONE
250 B=B+1
260 IF B=50 THEN RETURN
270 GOTO 250
280 PRINT "FAIL"
```

TABLE 1-continued

```
290 GOTO 100
300 PRINT "PASS"
310 GOTO 100
320 D=0:E=0:F=0:G=0
330 D=D+1:Y=AND (@%FFFD,%F0)/16
340 IF Y=1 THEN E=E+1:REM 480 HZ
350 IF Y=2 THEN F=F+1:REM 440 HZ
360 Y=AND (@%FFFD,%8)/8
370 IF Y=0 THEN G=G+1:REM 1000 HZ
380 REM TIMEOUT AFTER 300 SAMPLES WITHOUT
    20 SUCCESSES
390 IF D=300 THEN 280
400 IF E=20 THEN 300
410 IF F=20 THEN 300
420 IF G=20 THEN 300
430 GOTO 330
440 X=AND (X,%FE):@2=X
450 PRINT "  NP 01,ZZZZ":REM DISABLE DATA TONE
460 X=AND (X,%7F):@2=x:REM ENABLE MONITOR
470 U=A−13
480 T=0
490 T=T+1
500 IF T<500 THEN GOTO 490
510 IF U>0 THEN U=U-1:GOTO 480
520 X=X+%C0:@2=X:REM MONITOR COMPLETE
530 PRINT "  NANSWER,P 00":REM ENABLE
    DATA TONE
540 T=0
550 T=T+1
560 IF T,200 THEN GOTO 550
570 GOTO 100
580 P=0
590 P=P+1
600 IF P<40 THEN GOTO 590
610 RETURN
999 STOP
```

In the preferred embodiment the single frequency tone detector 114, the call progress tone detector 116, and the ROM 106 are operatively connected to the microprocessor 104 over a tri-state buffer 118. The tri-state buffer 118 is connected to the microprocessor 104, in a manner known in the art, such that the microprocessor 104 changes the state of the tristate buffer 118 to either enable the tone detectors 114, 116 or the ROM 106 to transfer input data to the microprocessor 104. In the preferred embodiment, the ROM 106 is connected to the microprocessor 104 over an address latch 120 which buffers the address to the ROM 106 from the microprocessor 104.

In the preferred embodiment the test set 22 includes an analog switch 122 which provides one-way monitor capability from the called responder to the switching control center 10. As described in more detail below, the microprocessor 104 is preferably programmed, such that upon receiving a predetermined signal the analog switch 122 is enabled to provide the switching control center 10 with the ability to monitor an audio signal such as a prerecorded message originating at the dialed location. This test is hereinafter referred to as a cut-thru test.

The logic for the microprocessor 104 preferably includes means for determining which operation the technician at the switching control center 10 wishes to perform. That is, the microprocessor 104 includes means for the technician to selectively choose whether a call-thru verification test is to be performed or whether a cut-thru test is to be performed. This feature of the preferred embodiment is explained in more detail below.

Although not necessary for the general objects of the present invention, the test set 22 may also include a plurality of LED's 124 and an LED driver 126. The LED driver 126 is operatively connected to the single frequency tone detector 114 and the call progress tone detector 116 such that the LED's 124 will indicate or signal when a predetermined frequency has been detected by either the single frequency tone detector 114 or the call progress tone detector 116. This optional feature of the invention may be useful in determining whether the test set 22 has been properly connected and is functioning correctly before it is placed into actual operation. A technician can compare the detected tones from the called responder to the tones indicated by the LED's 124 to ensure that the test set 22 is properly identifying the signals.

In the preferred embodiment which is illustrated in the figures the test set 22 requires +5V, +12V and −12V DC power supplies. Therefore the test set 22 preferably also includes a power supply circuit 128 which converts 120V AC wall current to the required +5V, +12V and −12V DC power.

Figure 4:
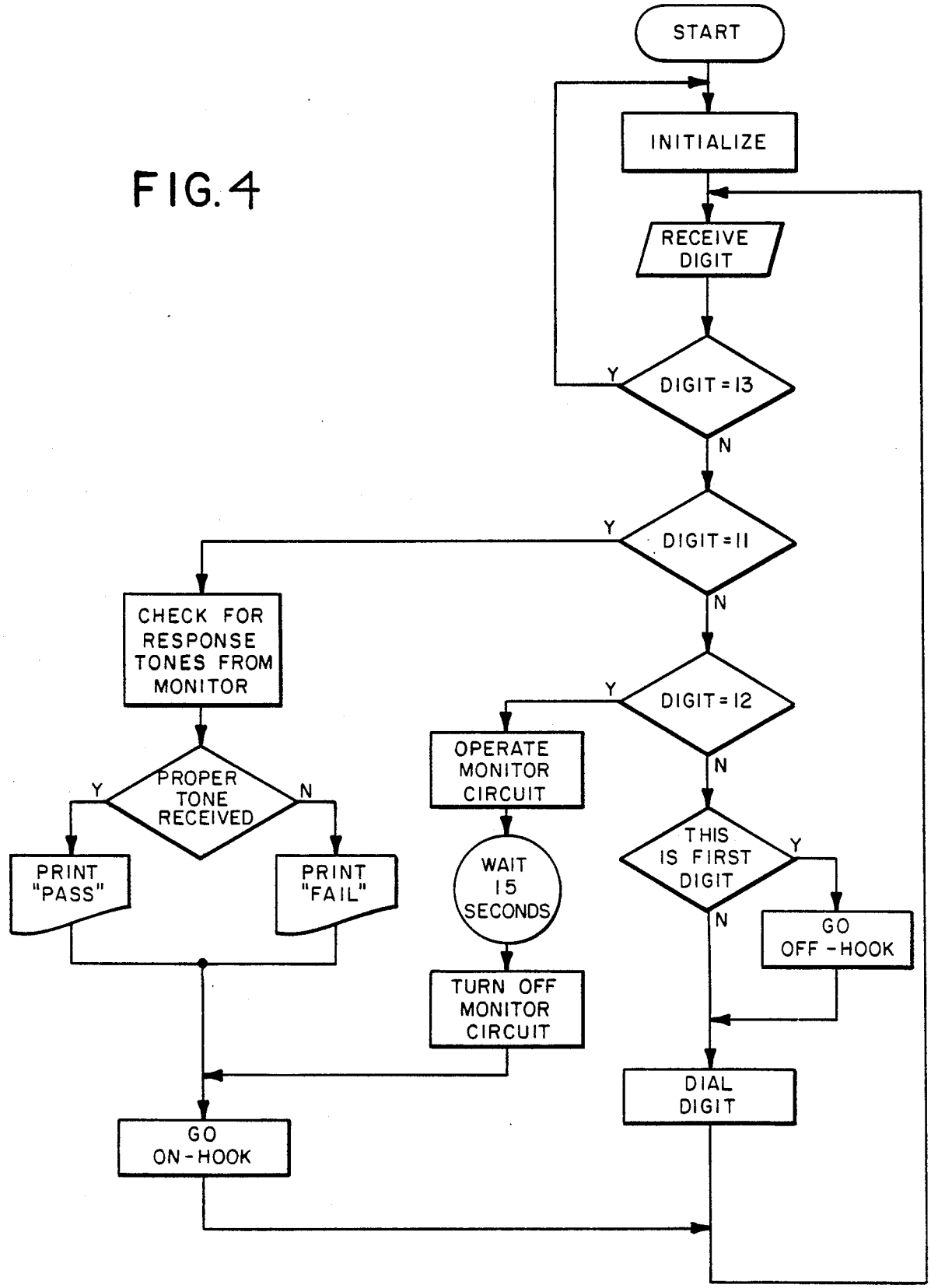
FIG. 4 is a flow chart representation of a preferred embodiment of the logic for the test set of the embodiment illustrated in FIGS. 2 and 3.

Referring now to FIG. 4, an example of a preferred embodiment of the logic and operation of the test set 22 is now given. When a call is placed from the switching control center 10 the microprocessor 104 is reset and awaits the digits which are to be dialed. In a preferred embodiment, the technician selects which test is to be performed by entering a predetermined combination of control digits. For example, digits 11, 12 and 13 may used to initiate an automatic call-thru test, a cut-thru test or to reset the test set 22, respectively. In the preferred embodiment these digits are entered and received one at a time with a carriage return after each digits. The digits 1–10 are outpulsed.

For a call-thru test, the digits to be dialed and the test code (11) is sent to the test set 22. The test set 22 then generates the DTMF digits and monitors the line from the responder 24 for the proper responses. The test set then transmits the results to the host computer 12.

For a cut-thru test, the telephone number to be dialed and the control digits (12) are sent to the test set 22. The test set 22 then generates the DTMF digits, disables the data tones to the originator and enables the monitor circuit for a preprogrammed period of time. At the end of this period, the test call is placed on hook, the analog switch or monitor circuit 122 is disabled, and the data connection is reestablished from the test set 22 to the switching control center 10.

If the reset code (13) is received, the test call is placed on hook and the microprocessor 104 is placed back in the ready mode.

Therefore, the test set and system of the present invention provides an efficient system with which a technician located at a switching control center can verify whether or not telephone calls are being properly routed and billed. An operator at a single central location can test several central offices to verify whether each of the central offices is properly communicating with all of the area codes and prefixes which it is servicing. Since the monitoring is performed automatically by a microprocessor and the associated circuitry, instead of by a human operator, the chances for human error in monitoring and recording the patterns of signals are minimized. Since the system eliminates the need for a technician to monitor the circuits manually, personnel may be used for more efficient functions.

Various different divisions of the carrier, such as the accounting division, the engineering division, the billing division, etc. may all be individually interfaced to the network.

Another aspect of the invention allows an operator located at the switching control center to automatically check communication between any two points in the network. The system thus provides a more efficient and economical method of making these tests over conventional procedures which typically require that a technician go to a central office to make the call. The present invention enables an operator at the switching control center to communicate with the test set at one of the central offices and to originate a call from this central office to any point in the network. A specific prerecorded announcement originating at the called destination may be monitored by enabling the analog switch 122 at the switching station. As discussed above, in this cut-thru test the monitor circuit is enabled for a programmable period of time which is sufficient for the operator to monitor the announcement and verify communication between the two points in the network.

The foregoing description of the preferred embodiments of the present invention has been presented for purposes of illustration and description. They are not intended to be exhaustive or to limit the invention to the precise forms disclosed, and obviously many modifications and variations are possible in light of the above teachings. The embodiments were chosen and described in order to best explain the principles of the invention and its practical applications, to thereby enable others skilled in the art to best utilize the invention in various embodiments and with various modifications as are suited to the particular use contemplated. It is intended that the scope of the invention be defined by the following claims, including all equivalents.

I claim:

1. A test set for checking, from a central testing station, a communication line from a central station to a plurality predetermined telephone responders, said responders each having a different predetermined telephone number and configured such that upon being dialed each responder generates a predetermined responder output signal code over a responder transmission medium, said responder output signal code consisting of a predetermined sequence of signals, said central testing station including means for inputting a test signal code identifying one of said predetermined telephone numbers and means for transmitting said test signal code over a transmitter transmission medium, said test set comprising:
   a signal detector responsive to an input signal code, said signal detector operative to generate an output identification signal code identifying said input signal code;
   a responder interface operatively interfacing said signal detector to said responder transmission medium such that an interfaced responder output signal code is transmitted to said detector as said detector input signal code;
   a memory, said memory including a correct responder signal code associated with said test signal code for each of said predetermined telephone responders, said correct responder signal code identifying the responder output signal code which should be received for a given test signal code;
   means for coupling said test set to said transmitter transmission medium; and
   a processor interfaced to said memory and operatively connected to receive said identification signal code and said test signal code, said processor including logic operative to access said correct responder signal code for an input test signal code, compare said identification signal to said correct responder signal code, and generate a result signal in response to said comparison.

2. The test set of claim 1 wherein said signal detector comprises a tone detector.

3. The test set of claim 2 wherein said central testing station includes a receiver connected to said test set over said transmitter transmission medium and wherein said test set further comprises a receiver interface operatively connected to interface said processor result signal to said receiver.

4. The test set of claim 3 wherein said receiver interface comprises a modem.

5. The test set of claim 2 further comprising a frequency generator responsive to a signal code and operative to generate a dialing signal in response thereto, said frequency generator operatively connected to receive said test signal and dial said predetermined telephone number.

6. The test set of claim 5 wherein said frequency generator comprises a dual-tone multiple frequency generator.

7. The test set of claim 1 wherein said responder interface comprises a transformer including means for connecting said transformer to said transmission medium.

8. The test set of claim 3 further comprising:
   monitor circuit means for operatively connecting said test set such that upon said monitor circuit means being engaged, said test set allows an audio signal received by said test set to be transmitted over said transmitter transmission medium; and
   wherein said processor logic is further operative to engage said monitor circuit means upon receiving a predetermined code signal.

9. A system for checking the routing for a telephone communication line in a telephone communication network, said system comprising:
   a central testing station including means for inputting a telephone number and a test code and means for generating a test input signal code corresponding to said input telephone number;
   an input signal transmission medium for transmitting said test input signal code;
   a plurality of responders each having a different predetermined telephone number with at least one of a different predetermined prefix and area code, each of said responders generating a predetermined responder output signal code;
   a responder transmission medium for transmitting said responder output signal;
   a test set including a signal detector operatively coupled to said responder transmission medium such that said signal detector receives said responder output signal code as an input and generates an output identification signal code identifying said input signal code; a memory, said memory including a correct responder output signal code for each of said test signal codes associated with said test signal; a processor interfaced to said memory and operatively coupled to said input signal transmission medium and to said signal detector such that said processor receives said test signal code and said input signal code, said processor including logic operative to access said correct responder signal code for an input test signal code in response to an input test signal code, compare said identification signal code to said correct responder signal code, and generate a result signal in response to said comparison.

10. The system of claim 9 further including a second receiver at a predetermined location operatively connected to receive said result signal.

11. The system of claim 9 wherein said system includes a plurality of responders, wherein one of said responders is assigned to each telephone prefix.

12. The system of claim 11 wherein at least two of said responders have a different area code.

13. The system of claim 9 wherein said central testing station is remote from said predetermined location.

14. The system of claim 9 wherein said signal detector comprises a tone detector.

15. The system of claim 14 further comprising a frequency generator responsive to a signal and operative to generate a dialing signal code in response thereto, said frequency generator operatively connected to receive said test signal and dial said predetermined telephone number.

16. The system of claim 15 wherein said frequency generator comprises a dual-tone multiple frequency generator.

17. The system of claim 9 further comprising:
monitor circuit means for operatively connecting said test set such that upon said monitor circuit means being engaged said test set receives a message over said responder transmission medium and transmits said message over said transmitter transmission medium; and
wherein said processor logic is further operative to engage said monitor circuit means upon receiving a predetermined code signal.

18. A system for checking a telephone communication network including a plurality of central offices, each office servicing at least two telephone numbers having at least one of a different prefix and area code, said system comprising:
a plurality of responders one for each different prefix and area code, each of said responders having a predetermined telephone number and each of said responders generating a predetermined responder output signal code;
a responder transmission medium for transmitting said output signals from said responders;
a central testing station located remote from each of said central offices, said central testing station including means for calling a test set and a transmitter for transmitting a test input signal code associated with the telephone number of one of said responders;
an input signal transmission medium for transmitting said test input signal code;
a test set including a signal detector operatively coupled to said responder transmission medium such that upon being called, said signal detector receives said responder output signal code for each responder having said test input signal code as an input and generates an identification signal code identifying said input signal code; a memory, said memory including a correct responder output signal code associated with each of said test input signal codes; a processor interfaced to aid memory and operatively coupled to said input signal transmission medium and to said signal detector such that said processor receives said test input signal code and said identification signal code, said processing including logic operative to access said correct responder signal code for said responder having said test input signal code in response to said test input signal code, compare said identification signal code to said correct responder signal code, and generate a result signal in response to said comparison; and
a receiver operatively connected to receive said result signal.

19. A telephone communication testing system for monitoring a call to a recorded announcement from a central office, said announcement being generated from said central office upon a predetermined telephone number being dialed, said system comprising:
a central testing station remote from said responder, said central testing station including a receiver, and a transmitter operative to transmit a telephone number signal;
a receiver and transmitter transmission medium for receiving and transmitting signals from said central testing station;
a test set coupled to said receiver and transmitter transmission medium, said test set including a frequency generator responsive to said telephone number signal and operative to generate a telephone dialing signal such that said frequency generator dials said predetermined telephone number, and a monitoring circuit operatively connected to receive said announcement and transmit said announcement to said central testing station over said transmission medium.

* * * * *

UNITED STATES PATENT AND TRADEMARK OFFICE
CERTIFICATE OF CORRECTION

PATENT NO. : 4,937,850

DATED : June 26, 1990

INVENTOR(S) : William F. Borbas et al.

It is certified that error appears in the above-identified patent and that said Letters Patent is hereby corrected as shown below:

In column 6, line 90 of TABLE I, please delete "" NP"" and substitute therefor --"^NP"--.

In column 7, line 450 of TABLE I, please delete "" NP 01,ZZZZ"" and substitute therefor --"^NP 01,ZZZZ"--.

In column 7, line 530 of TABLE I, please delete "" NANSWER,P 00"" and substitute therefor --"^NANSWER,P 00"--.

In claim 5, column 10, line 17, after "signal" please insert --code--.

In claim 5, column 10, line 19, after "signal" please insert --code--.

In claim 15, column 11, line 20, after "signal" please insert --code--.

UNITED STATES PATENT AND TRADEMARK OFFICE
CERTIFICATE OF CORRECTION

PATENT NO. : 4,937,850

DATED : June 26, 1990

INVENTOR(S) : William F. Borbas et al.

It is certified that error appears in the above-identified patent and that said Letters Patent is hereby corrected as shown below:

In claim 18, column 12, line 8, please delete "each" and substitute therefor --said--.

Signed and Sealed this

Eleventh Day of August, 1992

*Attest:*

DOUGLAS B. COMER

*Attesting Officer*  Acting Commissioner of Patents and Trademarks